United States Patent
Wisecarver et al.

(10) Patent No.: US 6,714,366 B2
(45) Date of Patent: Mar. 30, 2004

(54) OPTICAL COMPONENT MOUNTING APPARATUS

(75) Inventors: Martin Wisecarver, Fremont, CA (US); Charles Hu, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 10/225,381

(22) Filed: Aug. 21, 2002

(65) Prior Publication Data

US 2004/0036987 A1 Feb. 26, 2004

(51) Int. Cl.$^7$ .................................................. G02B 7/02
(52) U.S. Cl. ........................................................ 359/819
(58) Field of Search ................................ 359/819, 820; 362/455; 353/100

(56) References Cited

U.S. PATENT DOCUMENTS

| | | | |
|---|---|---|---|
| 5,073,047 A | 12/1991 | Suzuki et al. | 385/93 |
| 5,077,819 A | 12/1991 | Greil et al. | 385/79 |
| 5,506,424 A | 4/1996 | Wilcken | 257/99 |
| 5,703,992 A | 12/1997 | Bergmann | 385/139 |
| 5,737,346 A | 4/1998 | Stenstrom | 372/21 |
| 5,841,923 A | 11/1998 | Kyoya | 385/93 |
| 5,864,739 A * | 1/1999 | Kaneko et al. | 399/220 |
| 6,118,912 A | 9/2000 | Xu | 385/24 |
| 6,201,908 B1 | 3/2001 | Grann | 385/24 |
| 6,348,985 B1 | 2/2002 | Jiang et al. | 359/127 |
| 6,477,056 B1 | 11/2002 | Edwards et al. | 361/752 |
| 6,485,192 B1 | 11/2002 | Plotts et al. | 385/75 |
| 6,487,355 B1 | 11/2002 | Flanders | 385/134 |
| 6,619,818 B2 * | 9/2003 | Grove | 362/267 |

* cited by examiner

Primary Examiner—Ricky Mack
(74) Attorney, Agent, or Firm—Workman Nydegger

(57) ABSTRACT

Embodiments of the invention provide an improved optical component mounting apparatus. In one embodiment, the invention provides an optical component mounting apparatus that provides for accurate mounting of an optical component without the use of epoxy or other affixing agents. The optical component mounting apparatus includes a body having a bore formed longitudinally therethrough. A first end of the body includes an annular aperture configured to receive an optical component therein. The diameter of the aperture is generally less than the diameter of the optical component to be inserted therein, and therefore, the aperture expands to receive the optical component. Once the aperture is expanded and the optical component inserted, the aperture is allowed to contract, which operates to mechanically secure the optical component within the apparatus.

35 Claims, 3 Drawing Sheets

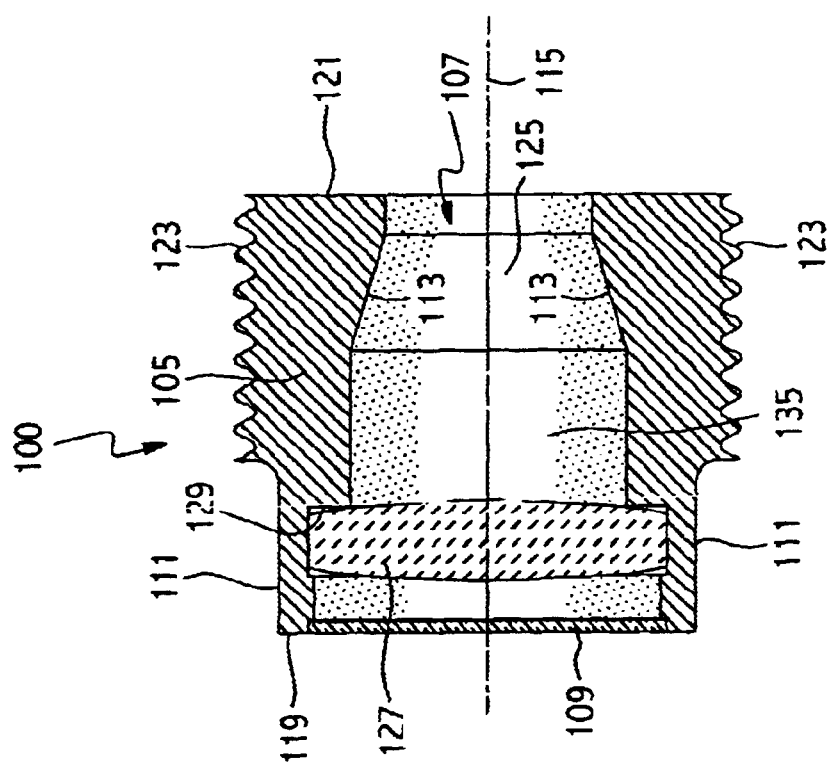
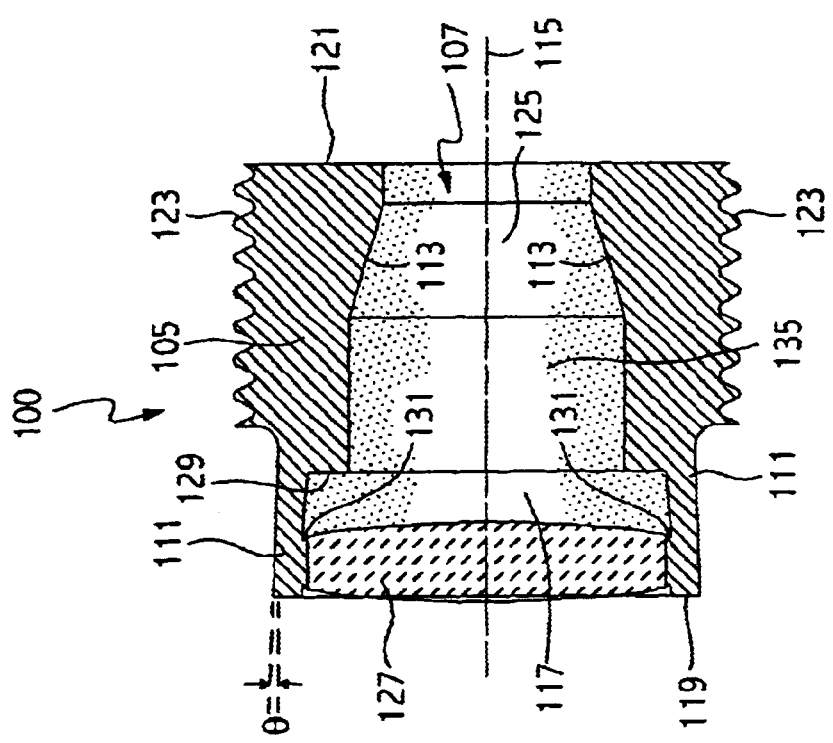
FIG. 4A
FIG. 4B

OPTICAL COMPONENT MOUNTING APPARATUS

BACKGROUND OF THE INVENTION

1. Field of the Invention

Embodiments of the invention generally relate to optical communication subsystems. More specifically, embodiments of the invention relate to optical interconnection devices used in optical communication subsystems.

2. Description of the Related Art

The manufacturing processes involved In generating optical systems generally requires precise alignment of lenses, prisms, mirrors, and other optical components. Precise alignment is particularly important in laser-based optical systems, as misalignment of the optical cavity may interfere with the feedback necessary for optical amplification, which may reduce or eliminate the optical gain needed for proper laser operation. Additionally, frequency doubling and other nonlinear processes involving crystals often require that the crystal be precisely aligned in order to achieve the optimum conversion efficiency.

To minimize alignment problems, optical mounts are frequently used to secure optical components therein. A retainer ring, spring-type retainer, or other means for exerting a biasing/securing pressure operates to secure the optical component within the mount, thereby reducing the chance that the optical component will be moved out of alignment. Often, however, the biasing pressure in conventional mounts is generally exerted in only one direction, which operates to bias the optical piece against a fixed member, thus preventing translational movement. However, these configurations may still be subject to small perturbations in directions other than the biasing pressure direction, such as, for example, in the rotational direction, which may cause misalignment of the optical signal. For example, many optical mounts (especially prism mounts) make use of a spring retainer, in which the spring retainer contacts the top of the optical component urging it down against a base plate. In this configuration, the optical component is prevented from being translated, however, rotational movement is not restricted. Conversely many lens and mirror mounts secure their optical components at their perimeter, thereby preventing rotation, however, these mounting configurations may be susceptible to translational movement or slippage. Another common optical component mounting technique is to damp the optical component in place with a rod that urges the optical component against one or more base plates, where the rod is attached to a post with locking screws, and the rod in turn is securely attached to the base plates. The use of screws can be problematic since they may loosen in time, particularly when they are exposed to the temperature cycling that often accompanies optical systems.

Another common approach to mounting optical components is to use epoxy-based mounts. In these configurations the optical component is placed in a mount and an epoxy is applied to the perimeter of the component. Once the epoxy cures, the component is generally affixed in the mount and is not susceptible to movement. However, although the use of epoxies is generally suitable for room temperature applications, epoxy mounts have shown weakness in environments where the temperature fluctuates, as epoxies and optical materials generally have different temperature coefficients of expansion. Thus, the epoxy may expand or contract at a different rate than the surrounding mount or the optical component itself, which can displace the optical component and potentially break the mounting bond.

Therefore, there is a need for a simple, easily manufactured, efficient, and cost effective optical component mounting apparatus that overcomes the disadvantages of conventional optical mounting devices.

SUMMARY OF THE INVENTION

Embodiments of the invention generally provide an apparatus for mounting optical components. In one embodiment, the invention provides a mounting apparatus having a body that has a first end and a second end optically coupled by a longitudinal axial bore formed therethrough. The first end includes an annular flexible sidewall defining an optical outlet diameter of the longitudinal bore and being adapted to flexibly accept an optical component therethrough. The second end defines an optical connection input diameter of the bore. The mounting apparatus also includes an optical component holding region disposed between the first end and the second end in axial alignment with the bore and sized to hold an optical component therein and exert a biasing force thereon to maintain the optical component in optical alignment.

Embodiments of the invention may further provide an optical component mounting apparatus, wherein the apparatus includes a body having a bore formed longitudinally therethrough. A first end of the body includes a radially expandable annular aperture configured to receive an optical component therein. The annular aperture generally has diameter sized less than the diameter of the optical component to be inserted therein, and therefore, in order to insert an optical component, the aperture diameter must be slightly expanded. Once the aperture is expanded and the optical component inserted, the aperture is allowed to contract and engage the optical components, which operates to mechanically secure the optical component within an annular component holding region.

Embodiments of the invention may further provide an optical interconnect, having a body with a longitudinal bore therethrough. A first end of the body includes an expandable sidewall portion of the body defining an insertion aperture adapted to expand when an optical component is inserted and to contract to mechanically secure the optical component within an optical component holding region. The optical interconnect also includes a second end of the body that includes a optical interface, and an exterior mounting section adapted to receive and mechanically couple a mating optical interconnect output to the optical interface.

BRIEF DESCRIPTION OF THE DRAWINGS

So that the manner in which the above recited features of the invention are obtained may be understood in detail, a more particular description of the invention, briefly summarized above, may be had by reference to the embodiments thereof, which are illustrated in the appended drawings. It is to be noted, however, that the appended drawings illustrate only typical embodiments of the invention, and are therefore, not to be considered limiting of its scope, for the invention may admit to other equally effective embodiments without departing from the true scope thereof.

FIG. 4A illustrates a partial cross-sectional view of optical component mounting apparatus of FIG. 1 during optical component installation.

FIG. 4B illustrates a partial cross-sectional view of optical component mounting apparatus of FIG. 1 after optical component installation.

DETAILED DESCRIPTION OF THE PREFERRED EMBODIMENT

Figure 1:
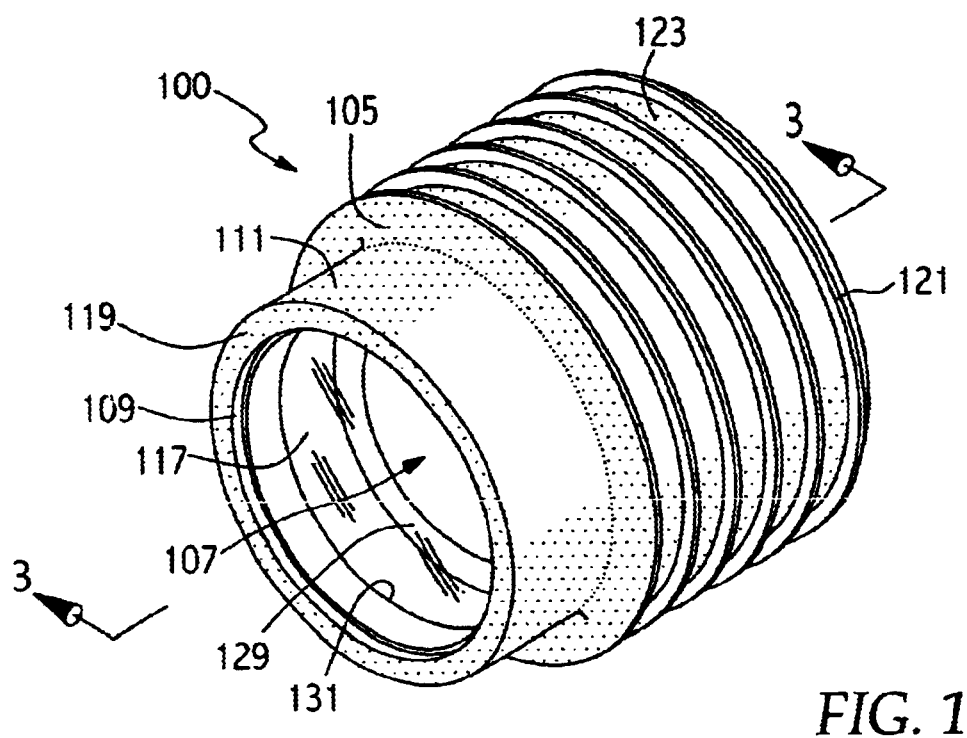
FIG. 1 illustrates a perspective view of one embodiment of an optical component mounting apparatus.
Figure 2:
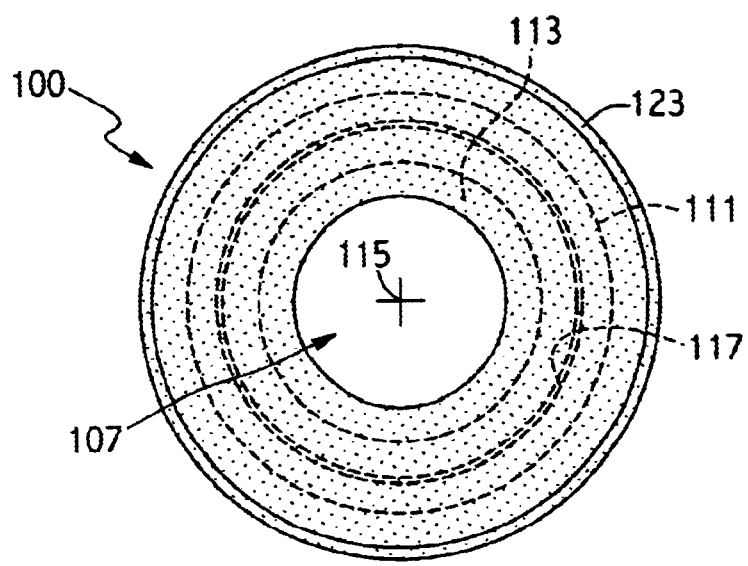
FIG. 2 illustrates an end view of the optical output side of the exemplary optical component mounting apparatus of FIG. 1.
Figure 3:
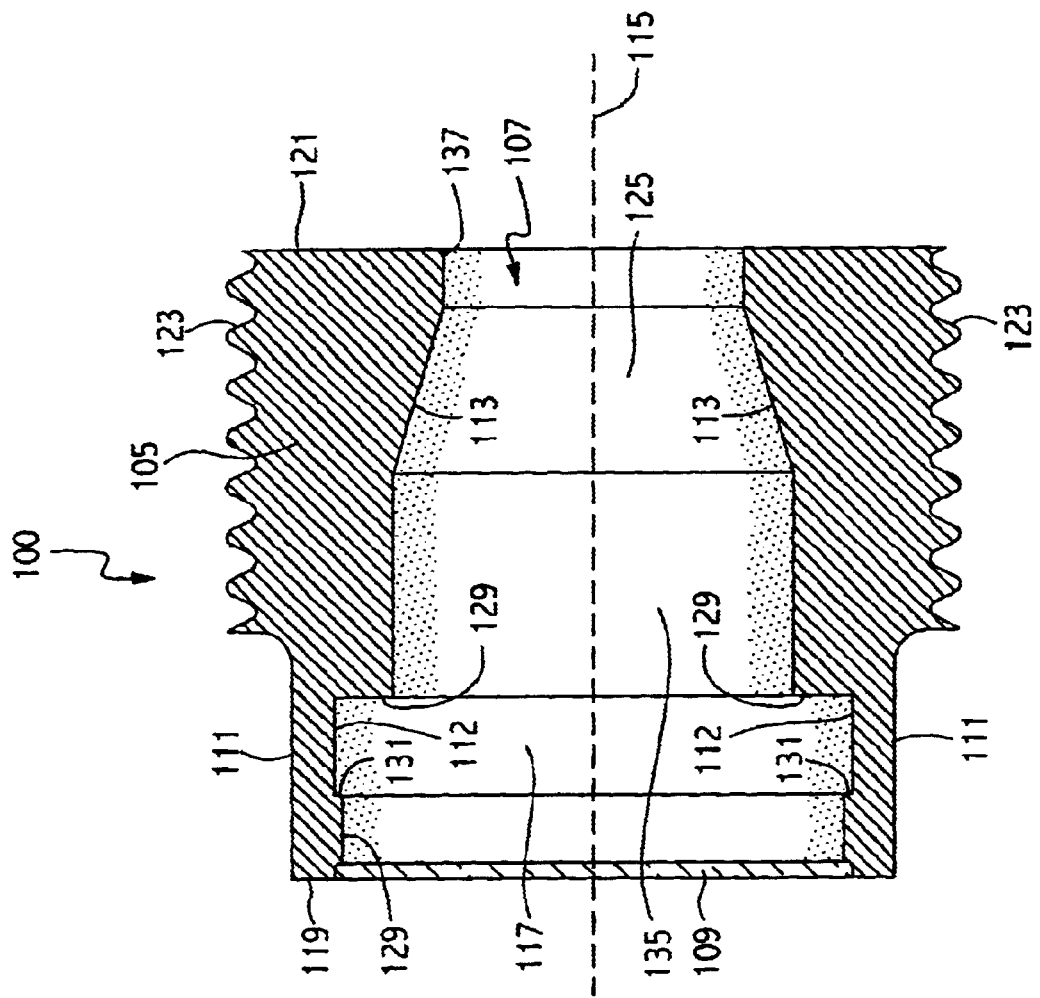
FIG. 3 illustrates a partial cross-sectional view of optical component mounting apparatus of FIG. 1 before optical component installation.

Embodiments of the invention generally provide an optical component mounting apparatus adapted hold an optical component therein. FIGS. 1–3 illustrate a perspective view, an end view, and a sectional view, respectively, of one embodiment of an optical interconnect device 100. The optical interconnect device 100 includes an outer body 105 having a bore 107 longitudinally formed therethrough. The outer body 105 may be formed of a high tensile elastic and/or semi-elastic metal material, such as CTE, stainless steel, and other materials adapted to provide stable support for optical components held therein, for example. The outer body 105 may further include one or more annularly shaped flexible sidewalls 111 adjacent an insertion aperture 119 (i.e., the end where an optical component is inserted), which is optically coupled to the bore 107. The outer body 105 may also include an interior annular sidewall 112 defining an interior annular cavity 117, which generally has a diameter greater than that of the insertion aperture 119 and a slightly smaller diameter than the optical components to be held therein prior to their insertion. The insertion aperture 119 may be disposed generally perpendicular to a longitudinal axis 115 of the bore 107. The annular cavity 117 may be adapted to hold one or more optical components therein in about axial alignment with the longitudinal axis 115 to form an optical path therethrough.

As illustrated in FIG. 3, the optical component mounting device 100 also generally includes a lid member 109 detachably disposed on the insertion aperture 119, wherein the lid member 109 may be formed from optically clear materials such as glass to prevent contamination from entering the annular cavity 117. Alternatively, lid member 109 may be a generally solid disk shaped member having a bore formed in a central portion thereof, wherein the bore is positioned in axial alignment with the longitudinal bore 107 to allow an optical signal to travel therethrough. Regardless of the specific configuration, lid 109 is generally configured to be attached to the insertion aperture 119 of the optical interconnect device 100. The attachment process may include a press operation, a snap in operation, and epoxy operation, or other operation suitable for attaching a lid to an optical component.

As illustrated in FIGS. 1–3, the body 105 may include an outer interconnecting surface 123 adapted to engage a mating connector (not shown). In one aspect of the invention, the interconnecting surface 123 may include an interlocking connection, such as a threaded surface, which may be engaged by another threaded surface to secure the mounting device 100 in another component. Alternatively, the interconnecting surface 123 may be an interference fit type connection adapted to frictionally couple the optical interconnect device 100 to another component.

As illustrated in FIGS. 1 and 3, the body 105 also generally includes an optical signal receiving end 121 adapted to receive an optical fiber or other optical connector therein. The optical signal receiving end 121 may include tapered sidewalls 113 adjacent an annular optical input cavity 125 adapted to support and hold a fiber optic cable and/or device inserted therein so that an optical signal emitted therefrom may be communicated through the interior of the mounting device 100 towards the lens cavity 117. As illustrated in FIG. 3, the optical input cavity 125 may include a fiber receiving cavity 135 sized to allow an end of a fiber optic cable (not shown) disposed within the fiber receiving cavity 135 room to expand back as close as possible to its normal diameter once inserted into the fiber receiving end 121. To mechanically secure a fiber optic cable/connector to the body 105, the tapered sidewalls 113 taper from the fiber receiving cavity 135 to an annular fiber grip wall 137 that forms the diameter of the bore 107 adjacent the optical signal receiving end 121. Therefore, the annular fiber grip wall 137 and tapered sidewalls 113 may cooperatively provide a gripping force on the fiber optic cable to secure the fiber optic cable from retraction, while allowing the fiber optic cable to expand within the fiber receiving cavity 135.

FIG. 4A is a cross-section of FIG. 1 with an optical component 127, such as a lens, for example, being inserted Into the annular cavity 117 via the insertion aperture 119. During the process of installing/inserting an optical component into the device 100, the flexible sidewalls 111 are configured to radially expand, i.e., the diameter of the flexible sidewalls 111 is configured to be able to increase slightly, which allows the outside diameter of the optical component 127 to be received within the inside diameter of the flexible sidewalls 111. Therefore, the flexible sidewalls 111 are generally manufactured to have an inside diameter that is slightly less than the outside diameter of the components being inserted into the devices 100. For example, during installation of a lens 127 having an outside diameter of twelve microns greater than the inside diameter of the insertion aperture 119, the flexible sidewalls 111 expand slightly more than about twelve microns to allow the lens 127 to be inserted into the annular cavity 117. The flexible sidewalls 111 may include an end support ledge 129 disposed adjacent the annular cavity 117 to provide a positional stop for the optical component 127 when inserted therein, i.e., to provide a longitudinal stop for the lens. The flexible sidewalls 111 may define the diameter of the bore 107 adjacent the insertion aperture 119. As optical components 127, such as a lens, often diffract light, the inside diameter of the flexible sidewalls 111 may be sized somewhat larger than the fiber receiving cavity 135 to minimze the loss of light therethrough.

As illustrated in FIG. 4B, once the optical component 127 is inserted to the proper longitudinal depth through the insertion aperture 119 and into the annular cavity 117, the flexible sidewalls 111 are adapted to return to their original diameter. or at least to a diameter as close as possible to the original diameter. Generally, the flexible sidewalls 111 will contract to an inside diameter about equal to and positioned in abutment with the outer diameter of the optical component 127 inserted therein, thus exerting a mounting force on the optical component 127. The flexible sidewalls 111 may include a clamp edge 131 adjacent the annular cavity 117 that impedes the optical component 127 from longitudinally moving backwards out of the annular cavity 117 once inserted and secured therein. Thus, the annular cavity 117, the clamp edge 131, and the support ledge 129 cooperatively support the optical component 127 in a desired position without the use of affixing agents, such as epoxy or mechanically actuated damp assemblies.

In one aspect, an insertion tool (not shown) is used to provide a uniform force to urge the optical component through the flexible sidewalls 111 while maintaining a force less than the breakage force of the optical component 127. The insertion tool for a lens, for example, may have a fixture configured to engage the lens surface (and not the outer diameter so that the outer diameter so that the fixture and the lens may fit into the device) for the purpose of pressing the lens into the device 100. However, the fixture will generally include an engagement surface configured to not scratch or otherwise damage the lens surface.

While the foregoing is directed to embodiments of the invention, other and further embodiments of the invention may be devised without departing from the basic scope thereof, where the scope thereof is determined by the claims that follow.

What is claimed is:

1. An apparatus for mounting an optical component, comprising
    a body having a first end and second end optically coupled together by a longitudinal axial bore formed therethrough,
    the first end having an annular flexible sidewall defining an optical outlet diameter of the longitudinal bore and adapted to expand in diameter to accept an optical lens therethrough,
    the second end defining an optical connection input diameter of the bore; and
    an optical lens holding region disposed between the first end and the second end in axial alignment with the bore and sized to hold the optical lens therein and exert a biasing force thereon to maintain the optical lens in optical alignment.

2. The apparatus of claim 1, further comprising an lid member disposed on and adapted to seal the first end of the body and allow for optical transmissions therethrough.

3. The apparatus of claim 1, wherein the body material is selected from CTE, stainless steel, and combinations thereof.

4. The apparatus of claim 1, wherein the optical lens holding region comprises an inside diameter sized about the same as an optical lens outside diameter.

5. The apparatus of claim 4, wherein the optical lens holding region comprises a support ledge disposed adjacent the second end, wherein an outside diameter of the support ledge defines the inside diameter of the optical lens holding region.

6. The apparatus of claim 4, wherein the optical lens holding region comprises a support ledge disposed adjacent the second end, wherein an inside diameter of support ledge defines an optical fiber receiving region having a smaller diameter than the inside diameter of the optical lens holding region.

7. The apparatus of claim 6, wherein the optical fiber receiving region includes tapered sidewalls that taper to an annular fiber grip wall that forms an optical transmission entry diameter of the bore.

8. The apparatus of claim 1, wherein the annular flexible sidewall defines an annular insertion opening having an inside diameter smaller than the optical lens outside diameter.

9. The apparatus of claim 8, wherein the body includes a damp edge defining an inner diameter of the optical component holding region.

10. The apparatus of claim 8, wherein the annular flexible sidewall is adapted to expand from a first inside diameter to a second inside diameter sized to accept the outside diameter of the optical lens therein.

11. The apparatus of claim 8, wherein the annular flexible sidewall contracts to about the first diameter once the optical lens has passed therethrough.

12. An optical component mounting apparatus, comprising:
    a body having a bore formed longitudinally therethrough; and
    a first end of the body including a radially expandable annular aperture configured to receive an optical component and having a receiving diameter sized less than the diameter of the optical component to be received, wherein once the aperture is expanded and the optical component received, the aperture is allowed to contract, which mechanically secures the optical component within an annular component holding region.

13. The apparatus of claim 12, further comprising a lid member disposed adjacent an insertion end of the body and adapted to allow light transmission therethrough.

14. The apparatus of claim 12, wherein the optical component holding region comprises an inside diameter sized about the same as the optical component outside diameter.

15. The apparatus of claim 12, wherein the expandable annular aperture defines an annular opening having an inside diameter smaller than the optical component outside diameter.

16. The apparatus of claim 12, wherein a clamp edge and support ledge of the body define the annular aperture therebetween.

17. The apparatus of claim 16, wherein an outside diameter of the clamp edge defines the inside diameter of the annular aperture.

18. The apparatus of claim 16, wherein an outside diameter of the support ledge defines the inside diameter of a fiber receiving region of the body.

19. The apparatus of claim 12, wherein the body is formed of metals selected from CTE, steel, and combinations thereof.

20. The apparatus of claim 12, further comprising a second end having an annular fiber grip wall defining an optical input diameter of the bore.

21. The apparatus of claim 20, wherein the grip wall is coupled to a fiber receiving region of the bore via tapered sidewalls of the body.

22. An optical interconnect, comprising:
    a body having a longitudinal bore therethrough;
    a first end of the body including a radially expandable sidewall portion of the body defining an insertion aperture adapted to expand when an optical component is inserted and to contract to mechanically secure the optical component within an optical component holding region;
    a second end of the body includes an optical interface; and
    an exterior mounting section adapted to receive and mechanically couple a mating optical interconnect output to the optical interface.

23. The optical interconnect of claim 22, wherein the body material is selected from CTE, stainless steel, and combinations thereof.

24. The optical interconnect of claim 22, wherein the optical component holding region comprises an inside diameter sized about the same as the optical component outside diameter.

25. The optical interconnect of claim 22, wherein the insertion aperture inside diameter is smaller than the optical component outside diameter.

26. The optical Interconnect of claim 22, wherein the optical interface includes at least one tapered wall adapted to grip an optical connection therein.

27. The optical interconnect of claim 22, wherein the optical component holding region is adapted to hold the optical component therein using friction.

28. The optical interconnect of claim 22, wherein an outside diameter of a clamp edge and support ledge of the body define the inside diameter of the optical component holding region disposed therebetween and in axial alignment with the bore.

29. The optical interconnect of claim 28, wherein an outside diameter of the clamp edge defines the inside diameter of the insertion aperture.

30. The optical interconnect of claim 28, wherein an outside diameter of the support ledge defines the inside diameter of a fiber receiving region of the bore adjacent the optical interface and in axial alignment therewith.

31. A method for mounting an optical component in an optical body, comprising expanding a flexible sidewall of a component insertion aperture formed into a terminating end of the optical body;

inserting the optical component into an Internal cavity of the optical body via the component insertion aperture; and contracting the flexible sidewall to a internal diameter that is slightly less than an outside diameter of the optical component to secure the optical component within the internal cavity.

32. The method of claim 1, wherein inserting the optical component comprises providing an insertion force to the optical component of a magnitude capable of urging the optical component through the component insertion aperture.

33. The method of claim 1, wherein the sidewall defines a clamp edge adjacent the component receiving bore configured to impede egress of the optical component back through the component insertion aperture.

34. The method of claim 1, wherein the sidewall is configured to radially expand to accept the optical component therethrough.

35. The method of claim 1, wherein the annular cavity provides an end support ledge to provide a positional stop for the optical component when received therein.

* * * * *

UNITED STATES PATENT AND TRADEMARK OFFICE
CERTIFICATE OF CORRECTION

PATENT NO. : 6,714,366 B2
APPLICATION NO. : 10/225381
DATED : March 30, 2004
INVENTOR(S) : Martin Wisecarver and Charles Hu Page 1 of 1

It is certified that error appears in the above-identified patent and that said Letters Patent is hereby corrected as shown below:

Column 1
Line 13, after "generally" change "requires" to --require--
Line 46, after "technique is to" change "damp" to --clamp--

Column 2
Line 33, after "which" change "operates" to --operate--
Line 45, before "optical" change "a" to --an--

Column 4
Line 51, before "or at least" change "diameter." to --diameter,--
Line 64, before "assemblies" change "damp" to --clamp--

Column 5
Line 4, remove "so that the outer diameter"
Line 15, after "comprising" insert --:--
Line 30, before "lid" change "an" to --a--
Line 59, before "edge" change "damp" to --clamp--

Column 6
Line 62, change "Interconnect" to --interconnect--

Column 7
Line 14, after "comprising" insert --:--
Line 18, change "Internal" to --internal--

Signed and Sealed this

Twenty-eighth Day of November, 2006

JON W. DUDAS
*Director of the United States Patent and Trademark Office*